United States Patent
Mihailik

(10) Patent No.: US 10,592,388 B1
(45) Date of Patent: Mar. 17, 2020

(54) METHODS FOR FACILITATING MORE EFFICIENT NETWORK MESSAGE EXCHANGE AND ANALYSIS AND DEVICES THEREOF

(71) Applicant: JPMorgan Chase Bank, N.A., New York, NY (US)

(72) Inventor: Oleg Dmitrievich Mihailik, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/142,939

(22) Filed: Sep. 26, 2018

(51) Int. Cl.
| | | |
|---|---|---|
| *H04L 29/08* | (2006.01) | |
| *G06F 11/36* | (2006.01) | |
| *G06F 8/70* | (2018.01) | |
| *G06F 16/951* | (2019.01) | |
| *G06F 16/958* | (2019.01) | |
| *G06F 16/23* | (2019.01) | |

(52) U.S. Cl.
CPC ............ *G06F 11/3612* (2013.01); *G06F 8/70* (2013.01); *G06F 16/2379* (2019.01); *G06F 16/951* (2019.01); *G06F 16/986* (2019.01); *H04L 67/02* (2013.01)

(58) Field of Classification Search
CPC ............................ G06F 11/3612; H04L 67/02
See application file for complete search history.

(56) References Cited

U.S. PATENT DOCUMENTS

| | | | | |
|---|---|---|---|---|
| 6,865,593 | B1 * | 3/2005 | Reshef | G06F 16/30 709/203 |
| 7,117,504 | B2 * | 10/2006 | Smith | G06F 8/20 719/328 |
| 2003/0182305 | A1 * | 9/2003 | Balva | G06F 16/9566 |
| 2005/0076327 | A1 * | 4/2005 | Helal | G06F 8/20 717/100 |
| 2006/0212514 | A1 * | 9/2006 | Saillet | G06F 16/95 709/203 |
| 2007/0288591 | A1 * | 12/2007 | Wong | G06F 16/9574 709/217 |
| 2011/0124319 | A1 * | 5/2011 | Fu | H04L 67/02 455/414.1 |

(Continued)

*Primary Examiner* — Philip Wang
(74) *Attorney, Agent, or Firm* — Greenblum & Bernstein, P.L.C.

(57) ABSTRACT

Methods, non-transitory computer readable media, and collaboration server devices that provide a web application to a developer device in response to a received request. The web application is configured to, when executed by a web browser, decode a hypertext transfer protocol (HTTP) request encoded in a uniform resource locator (URL) associated with the received request for the web application, and output the decoded HTTP request in the web browser. The web application is further configured to dynamically update the URL in response to one or more received modifications to the decoded HTTP request. Additionally, the web application is configured to execute the modified HTTP request in accordance with an HTTP method, receive an HTTP response from a distributed application, and output the HTTP response in the web browser. With this technology, developers of distributed applications can more efficiently share HTTP requests to facilitate improved development and debugging.

18 Claims, 8 Drawing Sheets

(56) References Cited

U.S. PATENT DOCUMENTS

| | | | | |
|---|---|---|---|---|
| 2011/0161823 A1* | 6/2011 | Miyata | ............... | H04N 1/00204 |
| | | | | 715/733 |
| 2011/0321010 A1* | 12/2011 | Wang | ...................... | G06F 9/449 |
| | | | | 717/116 |
| 2012/0246312 A1* | 9/2012 | Exton | ................... | H04L 63/168 |
| | | | | 709/225 |
| 2014/0006481 A1* | 1/2014 | Frey | .................... | H04L 41/0246 |
| | | | | 709/203 |

* cited by examiner

METHODS FOR FACILITATING MORE EFFICIENT NETWORK MESSAGE EXCHANGE AND ANALYSIS AND DEVICES THEREOF

FIELD

This technology generally relates to facilitating improved distributed application development and, more particularly, to methods and devices for more efficient and effective exchange and analysis of network messages.

BACKGROUND

Many software developers collaborate to design and develop distributed applications that have a back-end and front-end or client/server architecture and operate based on messages exchanged over communication networks. Testing and debugging, for example, often involve sending network messages, such as hypertext transfer protocol (HTTP) requests, and receiving responses, including HTTP responses, which can be analyzed to determine whether the distributed application is operating as expected or to identify and address application faults or errors.

In order to test and debug distributed applications, or otherwise investigate distributed application behavior, collaborating software developers often exchange network messages that the distributed application is generating or processing. Capturing and exchanging the network messages is generally a manual task that requires significant resources, thereby reducing the resources available for other software development tasks. Additionally, many current manual methods of exchanging network messages are susceptible to human error.

Current network message exchange methods also do not present the exchanged messages in an effective manner for use or analysis by a recipient. In particular, network messages are less useful when received in a format that is not human-readable or cannot be queried. Moreover, many methods of capturing network messages do not allow manipulation of the messages that would facilitate more effective analysis and investigation of the distributed application behavior for debugging or testing purposes. For example, developers often generate and send screenshots or other images of HTTP request or response content, which do not facilitate manipulation of the content represented therein.

SUMMARY

A method for facilitating improved distributed application development, implemented by one or more collaboration server devices, includes providing a web application to a developer device in response to a received request. The web application is configured to, when executed by a web browser, decode a hypertext transfer protocol (HTTP) request encoded in a uniform resource locator (URL) associated with the received request for the web application, and output the decoded HTTP request in the web browser. The web application is further configured to dynamically update the URL in response to one or more received modifications to the decoded HTTP request. Additionally, the web application is configured to execute the modified HTTP request in accordance with an HTTP method, receive an HTTP response from a distributed application, and output the HTTP response in the web browser.

A collaboration server device includes memory comprising programmed instructions stored thereon and one or more processors configured to be capable of executing the stored programmed instructions to provide a web application to a developer device in response to a received request. The web application is configured to, when executed by a web browser, decode an HTTP request encoded in a URL associated with the received request for the web application, and output the decoded HTTP request in the web browser. The web application is further configured to dynamically update the URL in response to one or more received modifications to the decoded HTTP request. Additionally, the web application is configured to execute the modified HTTP request in accordance with an HTTP method, receive an HTTP response from a distributed application, and output the HTTP response in the web browser.

A non-transitory computer readable medium having stored thereon instructions for facilitating improved distributed application development includes executable code which when executed by one or more processors, causes the processors to provide a web application to a developer device in response to a received request. The web application is configured to, when executed by a web browser, decode a HTTP request encoded in a URL associated with the received request for the web application, and output the decoded HTTP request in the web browser. The web application is further configured to dynamically update the URL in response to one or more received modifications to the decoded HTTP request. Additionally, the web application is configured to execute the modified HTTP request in accordance with an HTTP method, receive an HTTP response from a distributed application, and output the HTTP response in the web browser.

This technology has a number of associated advantages including providing methods, non-transitory computer readable media, and collaboration server devices that facilitate improved distributed application development. With this technology, the structure and content of an HTTP request can be encoded into a URL that identifies a message exchange web application. Exchange of the URL allows a recipient to request the message exchange web application and view the encoded HTTP request in a web browser in an improved format that can be manipulated, queried, and used to generate an HTTP response from a distributed application. Accordingly, network messages including HTTP requests, can advantageously be exchanged and analyzed more efficiently and effectively with this technology to facilitate improved developer collaboration and application testing and debugging.

BRIEF DESCRIPTION OF THE DRAWINGS

FIG. 7 is a screenshot of an exemplary response panel of a web page with a portion of an HTTP response organized according to an identified tabular format; and FIG. 8 is a screenshot of an exemplary query of an HTTP response facilitated within a response panel of a web page.

DETAILED DESCRIPTION

Figure 1:
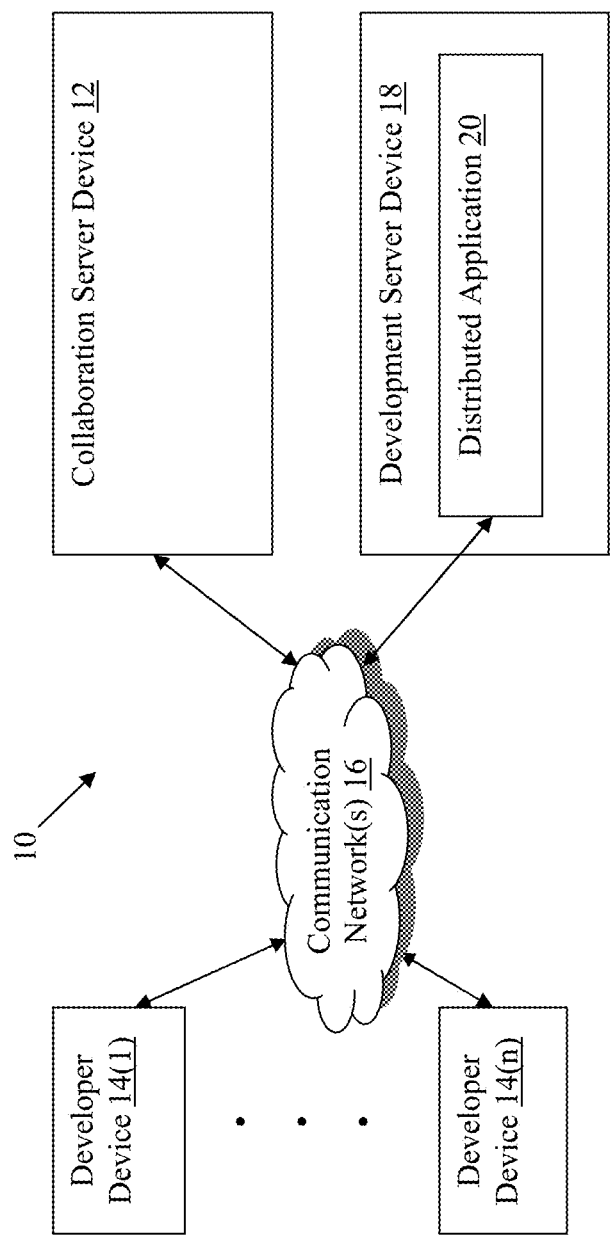
FIG. 1 is a block diagram of an exemplary network environment with an exemplary collaboration server device.

Referring to FIG. 1, an exemplary network environment 10 with an exemplary unified collaboration server device 12 is illustrated. The collaboration server device 12 in this example is coupled to a plurality of developer devices 14(1)-14(n) via communication network(s) 16, which are coupled to a development server device 18 hosting a distributed application 20 via the communication network(s) 16, although the collaboration server device 12, developer devices 14(1)-14(n), and development server device 18 may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and collaboration server devices that facilitate improved distributed application development by more efficiently and effectively exchanging network messages.

Figure 2:
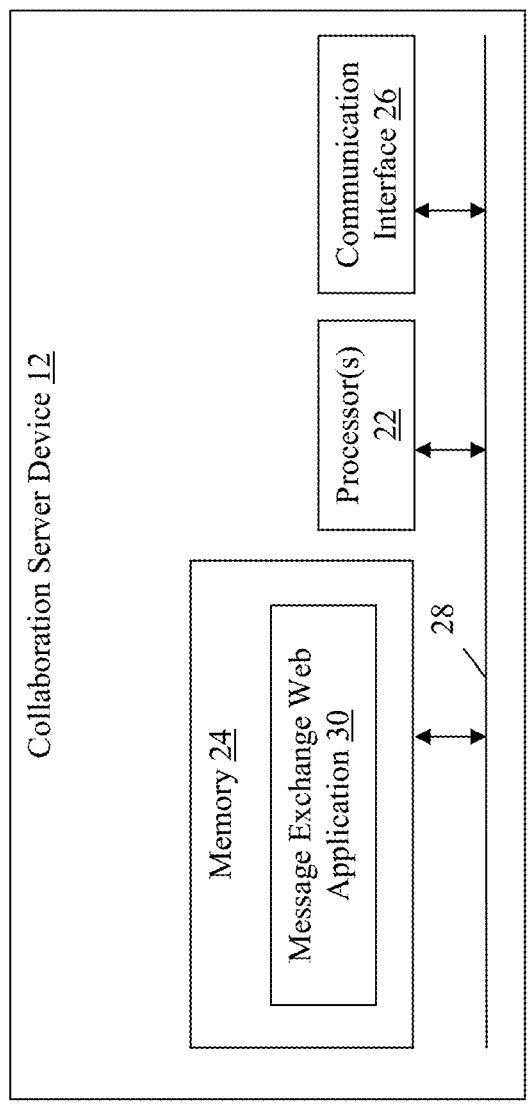
FIG. 2 is a block diagram of the collaboration server device of FIG. 1.

Referring to FIGS. 1-2, the collaboration server device 12 in this example includes processor(s) 22, memory 24, and/or a communication interface 26, which are coupled together by a bus 28 or other communication link, although the collaboration server device 12 can include other types and/or numbers of elements in other configurations. The processor(s) 22 of the collaboration server device 12 may execute programmed instructions stored in the memory 24 for the any number of functions described and illustrated herein. The processor(s) 22 may include one or more CPUs or processing cores, for example, although other types of processor(s) can also be used.

The memory 24 of the collaboration server device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Accordingly, the memory 24 of the collaboration server device 12 can store one or more applications that can include executable instructions that, when executed by the collaboration server device 12, cause the collaboration server device 12 to perform actions, such as to transmit, receive, or otherwise process network messages and to perform other actions described and illustrated below with reference to FIGS. 3-8. The application(s) can be implemented as operating system extensions, modules, plugins, or components of other applications.

Even further, the application(s) may be operative in a cloud-based computing environment. The application(s) can be executed within or as virtual machine(s) or virtual server(s) that may be managed in a cloud-based computing environment. Also, the application(s), and even the collaboration server device 12, may be located in virtual server(s) running in a cloud-based computing environment rather than being tied to one or more specific physical network computing devices. Also, the application(s) may be running in one or more virtual machines (VMs) executing on the collaboration server device 12. Additionally, in one or more embodiments of this technology, virtual machine(s) running on the collaboration server device 12 may be managed or supervised by a hypervisor.

In this particular example, the memory 24 of the collaboration server device 12 includes a message exchange web application 30, although other types or number of modules, applications, or databases can also be included in other examples. The message exchange web application 30 in this example is configured to be provided by the collaboration server device 12 to a requesting one of the developer devices 14(1)-14(n) for execution by a web browser of the requesting one of the developer devices 14(1)-14(n). When executed by the web browser, the message exchange web application 30 causes the web browser to render a web page with request and response panels for displaying an HTTP request and an HTTP response, respectively.

The message exchange web application 30 is further configured to encode modifications to an HTTP request output in the response panel and dynamically update a URL in an address bar of the web browser to include the encoded modifications. The URL identifies the message exchange web application 30 and can be exchanged between developer devices 14(1)-14(n). Accordingly, a web browser on a recipient one of the developer devices 14(1)-14(n) can request the message exchange web application 30 using the URL. When executed in the web browser, the received message exchange web application 30 decodes and outputs, to a request panel, an HTTP message encoded in the URL.

The message exchange web application 30 can also initiate an HTTP method (e.g., GET or POST) using the output HTTP request to obtain, and render in a response panel, an HTTP response from the distributed application 20. Accordingly, developers using the developer device 14(1)-14(n) can exchange HTTP requests based on an exchange of a URL that identifies the message exchange web application 30 and includes an encoded version of the HTTP request. A developer using a recipient one of the developer devices 14(1)-14(n) can then investigate the behavior of the distributed application 20 using the HTTP request in order to test or debug the distributed application 20, or otherwise assist or collaborate with a developer using a sending one of the developer devices 14(1)-14(n). The operation of the message exchange web application 30 is described and illustrated in more detail later with reference to FIG. 3.

The communication interface 26 of the collaboration server device 12 operatively couples and communicates between the collaboration server device 12 and developer devices 14(1)-14(n), which are coupled together by the communication network(s) 16, although other types and/or numbers of communication networks or systems with other types and/or numbers of connections and/or configurations to other devices and/or elements can also be used.

By way of example only, the communication network(s) 16 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 16 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The developer devices 14(1)-14(n) in this example include any type of computing device that can interface with the collaboration server device 12 via the communication network(s) 16. Each of the developer devices 14(1)-14(n) in this example includes processor(s), memory, and a communication interface, which are coupled together by a bus or other communication link, although other numbers and/or types of network devices could be used.

The developer devices 14(1)-14(n) may run interface applications, such as standard web browsers, which may provide an interface to communicate with the collaboration server device 12 via the communication network(s) 16 to obtain and render the message exchange web application 30. The developer devices 14(1)-14(n) may further include a display device, such as a display screen or touchscreen, and/or an input device, such as a keyboard, for example, which can be used to receive and interface with web page(s) rendered by the message exchange web application 30. Accordingly, one or more of the developer devices 14(1)-14(n) can be a smartphone, tablet, laptop, desktop, or another type of computing platform.

The development server device 18 hosts the distributed application 20 in this example, although one or more development server devices can host the distributed application 20 or one or more other distributed applications in other examples. The development server device 18 in this example includes processor(s), memory, and a communication interface, which are coupled together by a bus or other communication link, although other numbers and/or types of network devices could be used.

The distributed application 20 in this example is hosted within the memory of the development server device 18 and is being developed, tested, and/or debugged, for example, by users of the developer devices 14(1)-14(n) via communication network(s) 16. In other examples, the message exchange web application 30 can be hosted by the development server device 18 or the distributed application 20 can be hosted by the collaboration server device 12.

Although the exemplary network environment 10 with the collaboration server device 12, developer devices 14(1)-14(n), development server device 18, and communication network(s) 16 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the collaboration server device 12, developer devices 14(1)-14(n), or development server device 18, for example, may be configured to operate as virtual instances on the same physical machine. In other words, one or more of the collaboration server device 12, developer devices 14(1)-14(n), or development server device 18 may operate on the same physical device rather than as separate devices communicating through communication network(s). Additionally, there may be more or fewer collaboration server devices, developer devices, or development server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
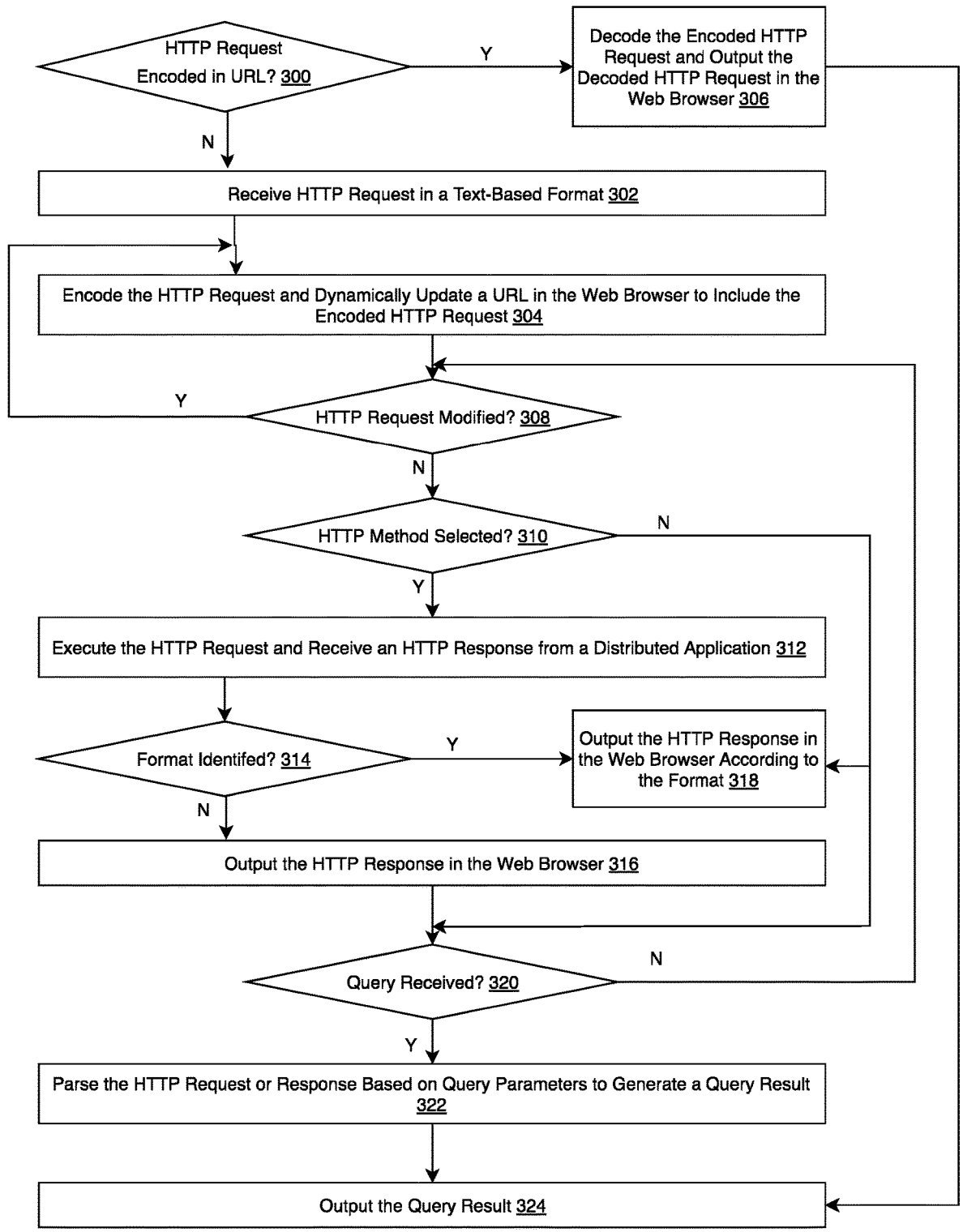
FIG. 3 is a flowchart of an exemplary method for facilitating more efficient and effective network message exchange and analysis.

An exemplary method of improved distributed application development will now be described with reference to FIGS. 3-8. Referring more specifically to FIG. 3, a flowchart of an exemplary method for facilitating more efficient and effective network message exchange and analysis is illustrated. In this example, the method exchange web application 30 is configured to execute the method described and illustrated with reference to FIG. 3. Accordingly, the collaboration server device 12 provides the message exchange web application 30 to one of the developer devices 14(1)-14(n) in response to a received request. A web browser on the one of the developer devices 14(1)-14(n) then executes the received message exchange web application 30.

In step 300 in this example, the message exchange web application 30 executed by a web browser of the one of the developer devices 14(1)-14(n) determines whether an HTTP request is encoded in the URL associated with the request for the message exchange web application 30. The message exchange web application 30 can be requested by the one of the developer devices 14(1)-14(n) in order to facilitate sending an HTTP request to another of the developer devices 14(1)-14(n), in which case the URL associated with the request for the message exchange web application 30 merely identifies the message exchange web application 30. Accordingly, if the message exchange web application 30 determines that an HTTP request is not encoded in the URL, then the No branch is taken to step 302.

In step 302, the message exchange web application 30 receives an HTTP request in a text-based format. In this example, a user of the one of the developer devices 14(1)-14(n) may desire to share an HTTP request with another user of another of the developer devices 14(1)-14(n) so that the other user can execute the HTTP request against the distributed application 20 to investigate the behavior of the distributed application 20 with respect to the HTTP request, for example. The HTTP request can be captured using a browser utility (e.g., Google Chrome™ tracks HTTP requests in HAR format) or other third party software (e.g., Fiddler™ available from Progress Software Corporation of Bedford, Mass.).

Figure 4:
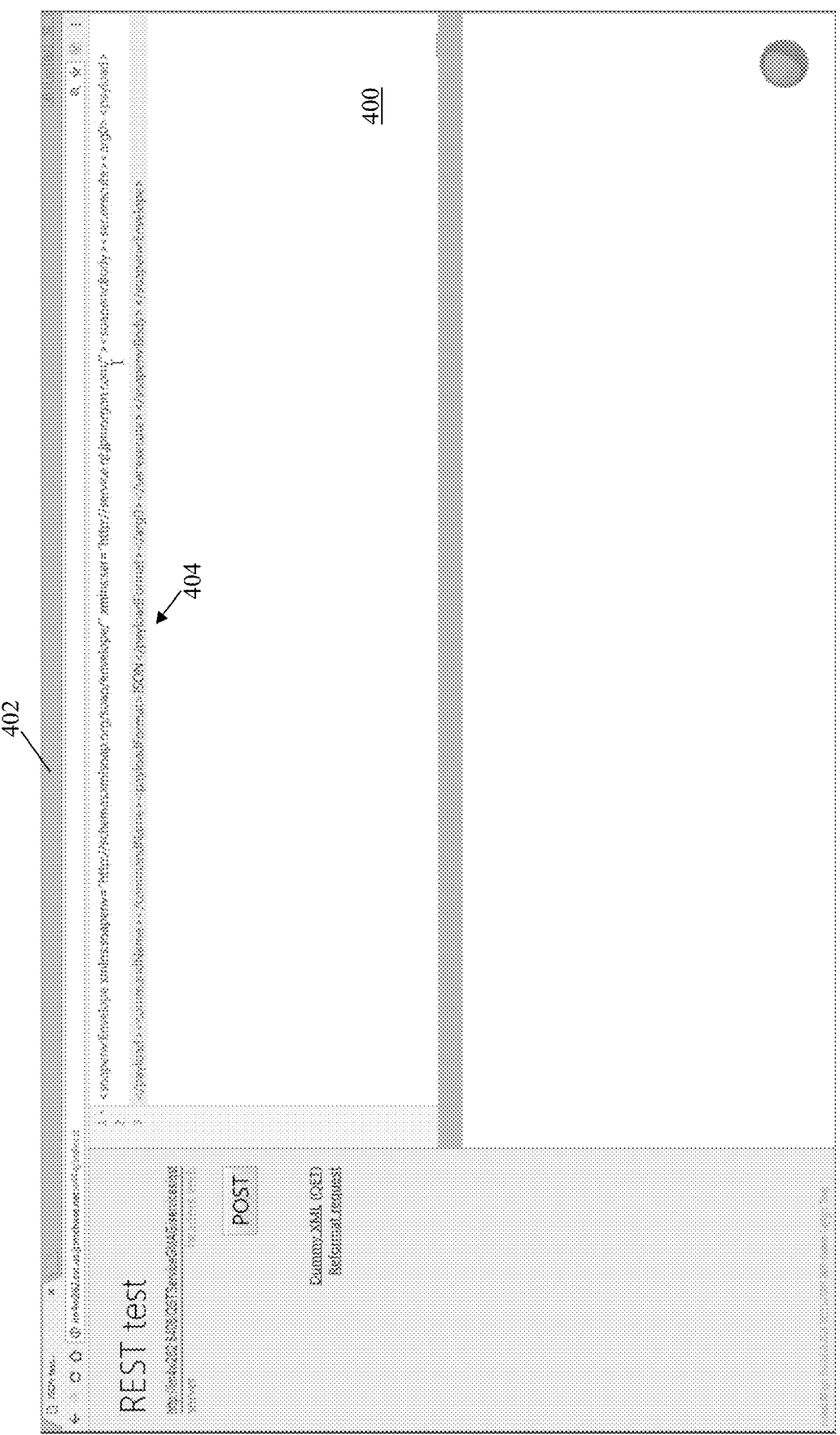
FIG. 4 is a screenshot of an exemplary request panel of a web page with an exemplary hypertext transfer protocol (HTTP) request.

Referring more specifically to FIG. 4, a screenshot of an exemplary request panel 400 of a web page 402 of the message exchange web application 30 with an exemplary HTTP request 404 is illustrated. In this example, the HTTP request 404 is received from a user of the one of the developer devices 14(1)-14(n) in the request panel 400, such as via a copy/paste operation subsequent to the capture of the HTTP request, for example. The HTTP request can also be received in other manners in other examples.

Referring back to FIG. 3, in step 304, the message exchange web application 30 encodes the HTTP request and updates a URL in an address bar of the web browser to include the encoded HTTP request. In one example, the message exchange web application 30 compresses the content associated with the received HTTP request and incorporates the compressed content into the URL in order to update the URL, although other types of encoding methods can also be used in other examples.

Referring back to step 300, in another example, the message exchange web application 30 can be requested by the one of the developer devices 14(1)-14(n) in order to facilitate receiving an HTTP request from another of the developer devices 14(1)-14(n). In this example, the URL can be exchanged between two of the developer devices 14(1)-14(n) (e.g., via e-mail, SMS message, chat, or any other communication medium) and will include an encoded HTTP request in addition to an identification of the message exchange web application 30. Accordingly, if the message exchange web application 30 determines that an HTTP request is encoded in the URL, then the Yes branch is taken to step 306.

In step 306, the message exchange web application 30 decodes the HTTP request encoded in the URL and outputs the decoded request in the web browser. In one example, the HTTP request can be decoded by decompressing the HTP request, although other methods of decoding the HTTP request can also be used in other examples. Optionally, the decoded HTTP request can be output to a request panel of a web page associated with the message exchange web application 30 executed in the web browser, although the decoded HTTP request can also be output in other manners.

Accordingly, an HTTP request can be received by the message exchange web application 20 either as manually inserted into a request panel by a user of a sending one of the developer devices 14(1)-14(n) or as decoded from a URL received at a recipient one of the developer devices 14(1)-14(n). Subsequent to encoding the HTTP request and updating the URL in step 304 or decoding the HTTP request and outputting the decoded HTTP request in step 306, the message exchange web application 20 proceeds to step 308 in this example.

In step 308, the message exchange web application 30 determines whether the HTTP request has been modified. A user of one of the developer devices 14(1)-14(n) may modify the HTTP request content in a request panel to facilitate testing or debugging of the distributed application 20, for example, although the HTTP request can be modified for any reason. If the message exchange web application 30 determines that the HTTP request has been modified, then the Yes branch is taken back to step 304.

Figure 5:
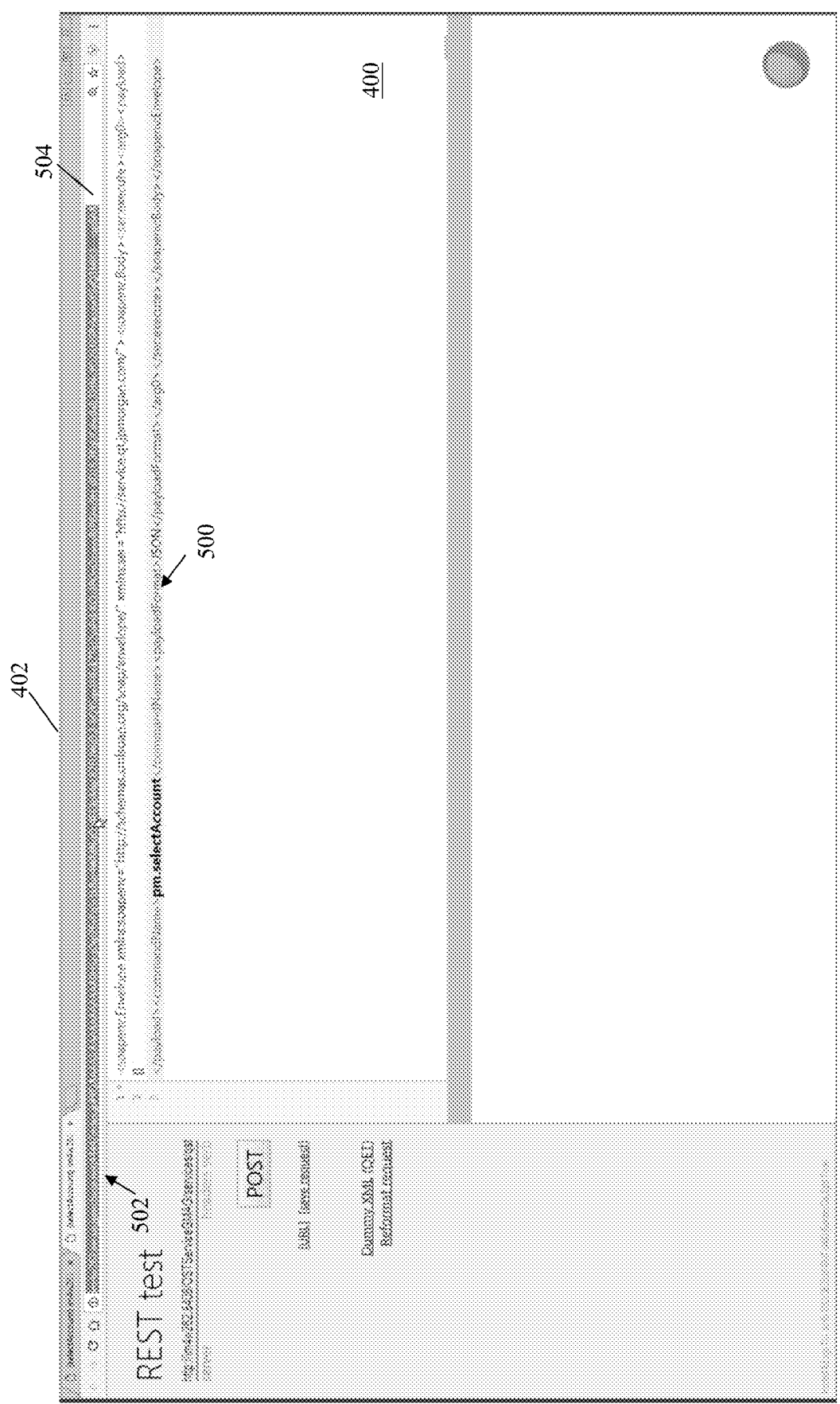
FIG. 5 is a screenshot of an exemplary request panel of a web page with a modified HTTP request and dynamically updated uniform resource locator (URL) in an address bar of a web browser rendering the web page.

In this iteration of step 304, the HTTP request, or a modified portion thereof, is encoded and the URL in the web browser is dynamically updated to incorporate an encoded version of at least the modified portion of the HTTP request. Referring more specifically to FIG. 5, a screenshot of the request panel 400 of the web page 402 with another HTTP request, which is a modified version of the HTTP request 404, and dynamically updated URL 502 in an address bar 504 of a web browser rendering the web page 402 is illustrated.

In this example, a user of one of the developer devices 14(1)-14(n) modifies the HTTP request 404 to add "pm.se-lectAccount" as a commandName resulting in the modified HTTP request 500. Additionally, the URL 502 in the address bar 504 is updated to include an encoded version of the "pm.selectAccount modification. Accordingly, the URL 502 in this example is dynamically updated in realtime responsive to modifications to the HTTP request 404 made in the request panel 400. Referring back to step 308, if the message exchange web application 30 determines that the HTTP request has not currently been modified, then the No branch is taken to step 310.

In step 310, the message exchange web application 30 determines whether an HTTP method has been selected. In this example, a user of one of the developer devices 14(1)-14(n) can select an HTTP method (e.g., GET or POST) in order to initiate execution of the HTTP request in the request panel in accordance with the selected HTTP method. If the message exchange web application 30 determines that an HTTP method was selected, then the Yes branch is taken to step 312.

In step 312, the message exchange web application 30 executes the HTTP request and receives an HTTP response from the distributed application 20. The HTTP method can be selected in order to facilitate testing or debugging of the distributed application 20, for example, by causing the HTTP request to be sent to the distributed application 20 and an HTTP response to be returned by the distributed application 20.

In step 314, the message exchange web application 30 optionally determines whether a particular format is identified within the HTTP response received in step 312. In this example, the message exchange web application 30 can parse or analyze the HTTP response to determine whether any pattern or particular type of data included therein is associated with a particular format. Exemplary formats of an HTTP response include tabular or time series formats, although other types and number of formats can also be identified in other examples. If the message exchange web application 30 determines that a format of content associated with the HTTP response is not identified, then the No branch is taken to step 316.

In step 316, the message exchange web application 30 outputs the HTTP response, such as in a response panel of a same web page rendered in the web browser and associated with the message exchange web application 30. Optionally, the message exchange web application 30 can organize or present the HTTP response in a structure corresponding to a human-readable format to improve analysis by a user of one of the developer devices 14(1)-14(n).

Figure 6:
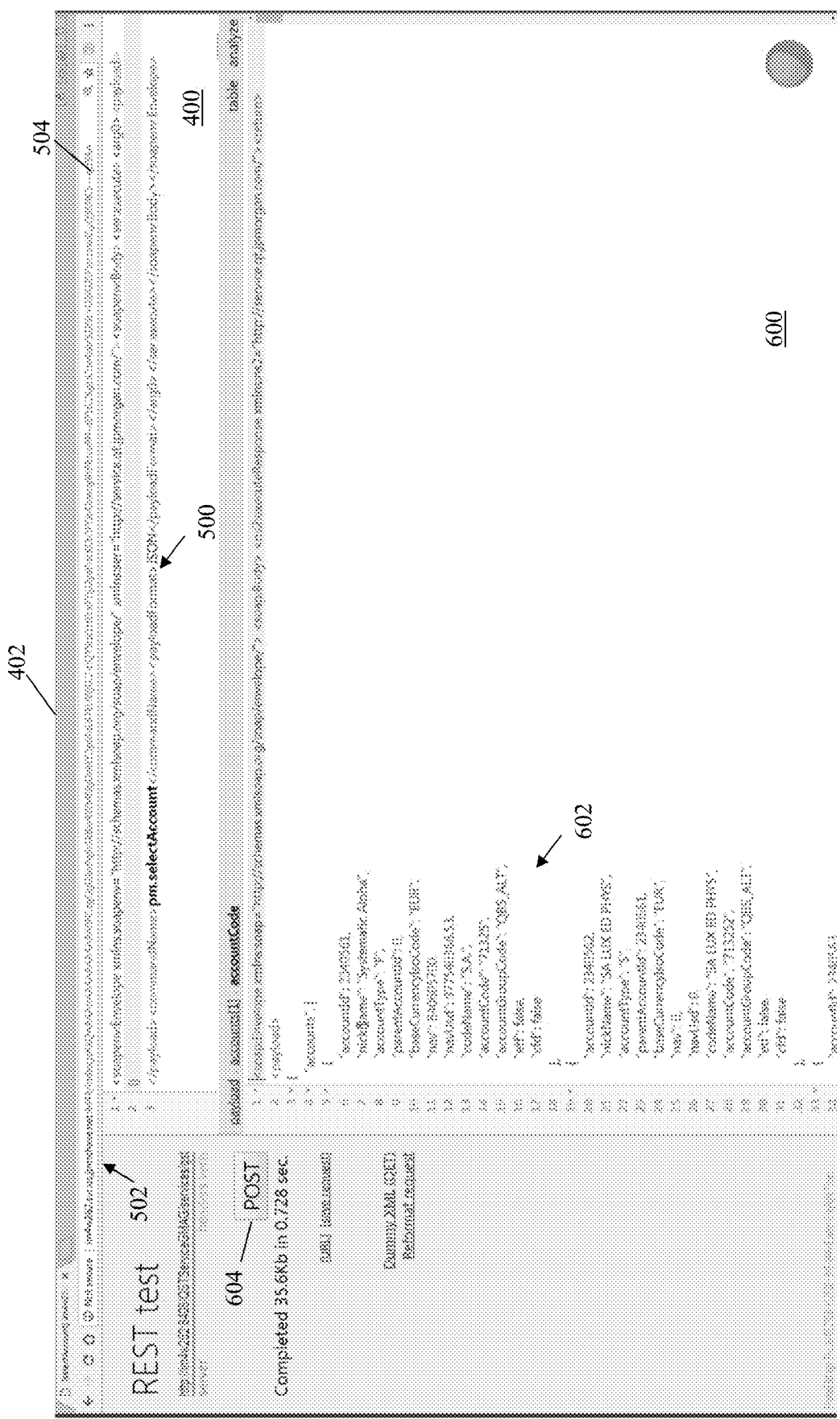
FIG. 6 is a screenshot of an exemplary response panel of a web page with an HTTP response from a distributed application based on a posted HTTP request in a request panel of the web page.

Referring more specifically to FIG. 6, a screenshot of the response panel 600 of the web page 402 with an HTTP response 602 from the distributed application 20 based on a posted HTTP request 500 in a request panel 400 of the web page 402 is illustrated. In this example, the HTTP method button 604 is selected to initiate the HTTP request 500 according to the POST HTTP method, resulting in the HTTP response 602 from the distributed application 20, which is output by the message exchange web application 30 in the response panel 600. Other methods of initiating the HTTP request, receiving an HTTP response, and outputting the HTTP response can also be used in other examples. Referring back to FIG. 3, if the message exchange web application 30 determines in step 314 that the format of the HTTP response is identified, then the Yes branch is taken to step 318.

Figure 7:
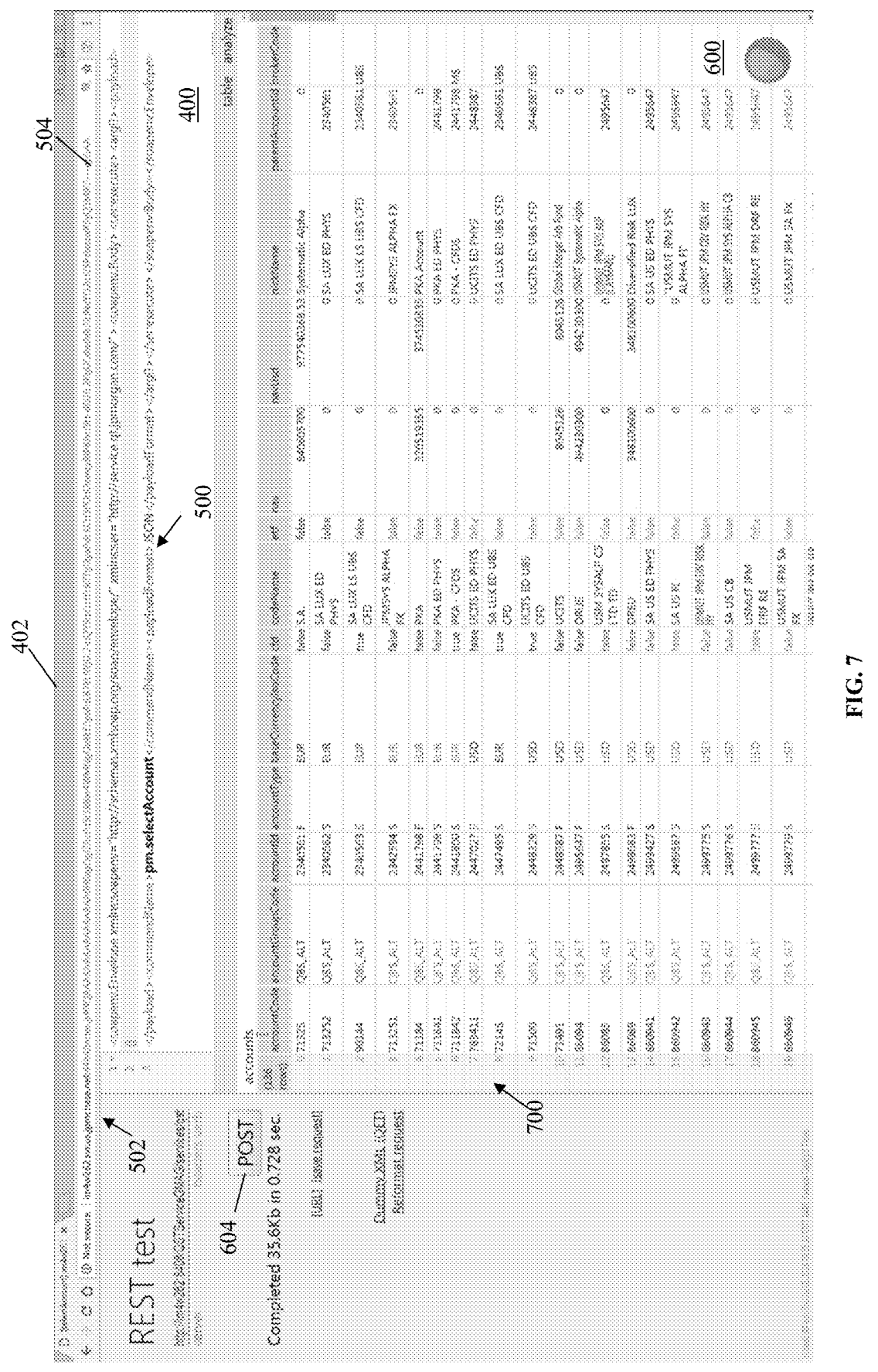

In step 318, the message exchange web application 30 outputs the HTTP response in the web browser according to the identified format. Referring more specifically to FIG. 7, a screenshot of the response panel 600 of the web page 402 with a portion of the HTTP response 602 organized in a table 700 and according to an identified tabular format is illustrated. In this example, the message exchange web application 30 analyzed the HTTP response 602, recognized a pattern based on the analysis, and identified a tabular format based on the recognized pattern.

The content of the HTTP response 602 could have been obtained from a database or the HTTP response 602 could have included a spreadsheet (e.g., XLS), for example. By presenting the content of the HTTP response 602 in a table based on an identified tabular format, the HTTP response can be analyze more efficiently and effectively by a user of one of the developer devices 14(1)-14(n), facilitating more efficient testing or debugging of the distributed application 20, for example. Subsequent to outputting the HTTP response in step 316 or step 318, or if the message exchange web application 30 determines that an HTTP method is not currently selected in step 310 and the No branch is taken, then the message exchange web application 30 proceeds to step 320.

In step 320, the message exchange web application 30 determines whether a query is received. The query can be facilitated using a graphical user interface (GUI) or a text-based script that is manually input by a user of one of the developer devices 14(1)-14(n), and other methods of facilitating the query can also be used in other examples. If the message exchange web application 30 determines that a query is received, then the Yes branch is taken to step 322.

In step 322, the message exchange web application 30 parses the HTTP request or response based on parameters included in the query to generate a query result. In one example, the message exchange web application 30 facilitates querying the HTTP request or the HTTP response to identify particular portions of the content related to those messages that may assist with testing or debugging the distributed application 20, or otherwise investigating the behavior of the distributed application 20, for example.

Figure 8:
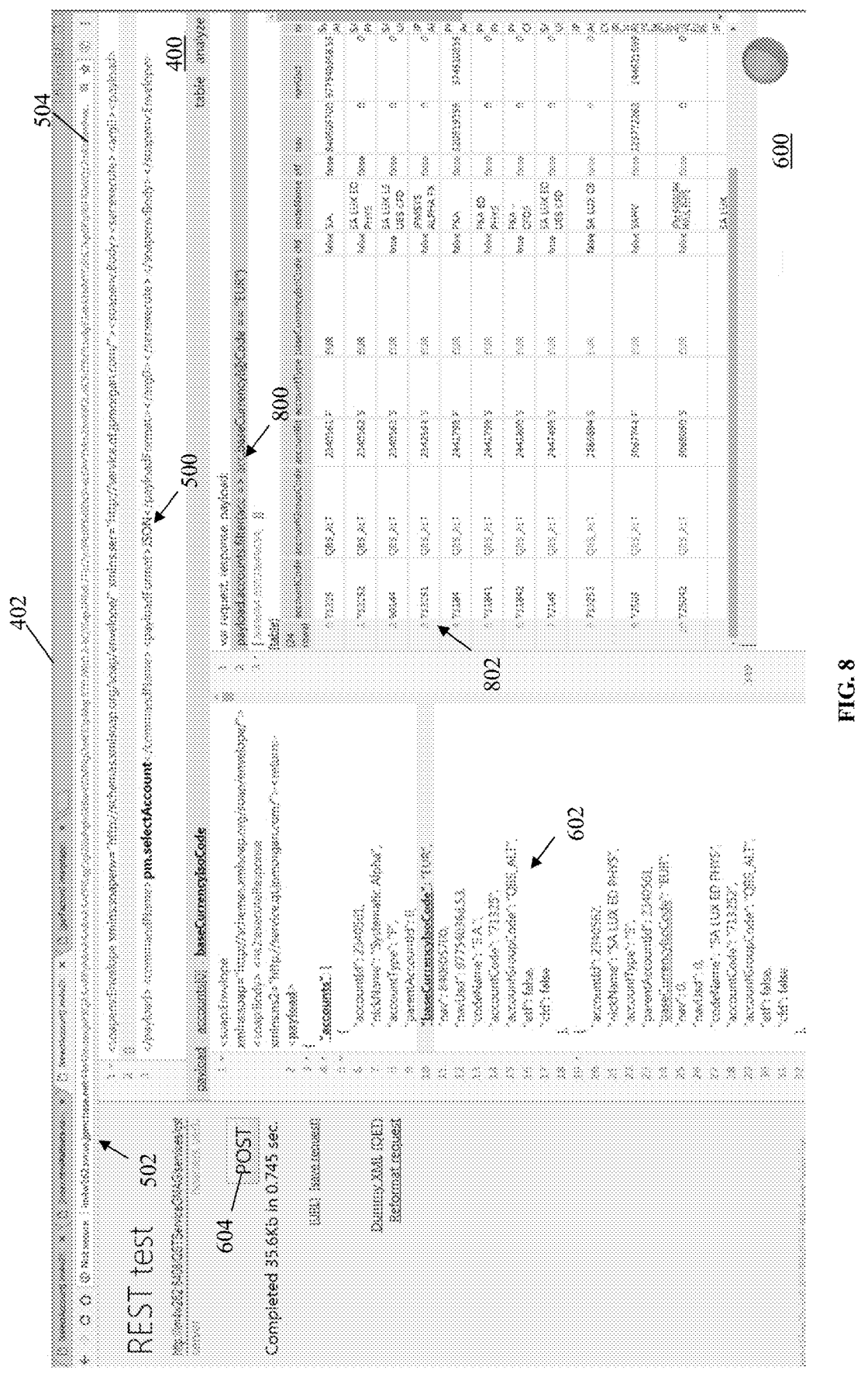

In step 324, the message exchange web application 30 outputs a query result. Referring more specifically to FIG. 8, a screenshot of an exemplary query 800 of the HTTP response 602 facilitated within the response panel 600 of the web page 402 is illustrated. In this example, the query 800 is based on a script and is a request to search the HTTP response 602 for accounts within the payload that have "EUR" as a "baseCurrencyIsoCode". In this example, the message exchange web application 30 outputs the query result 802 in the response panel 600 based on a tabular format identified in the HTTP response 602 or the result of the query 800. Other methods of facilitating querying within the message exchange web application 30 can also be used in other examples.

Referring back to FIG. 3, subsequent to outputting the query result in step 324, or if the message exchange web application 30 determines in step 320 that a query is not currently received and the No branch is taken, then the message exchange web application 30 proceeds back to step 308. In other examples, one or more of steps 304 and 308-324 can be performed in parallel. Additionally, the collaboration server device 12 can provide the message exchange web application 30 to more than one web browser, or web browser tab, on any of the developer devices 14(1)-14(n) for parallel execution of any of steps 300-324 for any number of different HTTP requests.

With this technology, the contents of an HTTP request can be exchanged more efficiently and effectively using a URL that identifies a web application and includes an encoded version of the HTTP request. Execution of the URL by a web browser on a developer device causes the web browser to retrieve and execute the web application, which decodes and outputs the HTTP request to facilitate modification of the HTTP request and analysis of an HTTP response by a distributed application to the HTTP request. Accordingly, this technology facilitates improved transmission, manipulation, analysis, and querying of HTTP requests to advantageously allow software developers to more efficiently test, debug, and analyze the behavior of distributed applications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating more efficient network message exchange and analysis, the method implemented by one or more collaboration server devices and comprising:
   providing a web application to a developer device in response to a received request for the web application, wherein the web application is configured to, when executed by a web browser of the developer device:
   determine whether a hypertext transfer protocol (HTTP) request is encoded in a uniform resource locator (URL) associated with the received request for the web application;
   decode the HTTP request and output the decoded HTTP request in the web browser;
   dynamically update the URL in response to one or more received modifications to the decoded HTTP request, the URL identifying the web application; and
   execute the modified HTTP request in accordance with an HTTP method, receive an HTTP response from a distributed application, and output the HTTP response in the web browser.

2. The method as set forth in claim 1, wherein the web application is further configured to, when executed by the web browser:
   decompress the HTTP request to decode and extract the HTTP request from the URL associated with the received request; and
   automatically compress content associated with the received modifications and incorporate the compressed content into the URL in order to dynamically update the URL in response to the received modifications.

3. The method as set forth in claim 1, wherein the web application is further configured to, when executed by the web browser:
   analyze the received HTTP response to identify a format of one or more portions of the HTTP response; and
   output the one or more portions of the HTTP response in the web browser according to the identified format.

4. The method as set forth in claim 3, wherein the identified format comprises a tabular format or a time series format.

5. The method as set forth in claim 1, wherein the web application is further configured to, when executed by the web browser:
   parse one or more of the output decoded HTTP request or HTTP response based on one or more received query parameters to generate a query result; and
   output the query result in the web browser.

6. The method as set forth in claim 1, wherein the decoded HTTP request and the HTTP response are output in respective panels of a same web page rendered by the web browser and the URL is dynamically updated in an address bar of the web browser.

7. A collaboration server device, comprising memory comprising programmed instructions stored thereon and one or more processors configured to be capable of executing the stored programmed instructions to:
   provide a web application to a developer device in response to a received request for the web application, wherein the web application is configured to, when executed by a web browser of the developer device:
      determine whether a hypertext transfer protocol (HTTP) request is encoded in a uniform resource locator (URL) associated with the received request for the web application;
      decode the HTTP request and output the decoded HTTP request in the web browser;
      dynamically update the URL in response to one or more received modifications to the decoded HTTP request, the URL identifying the web application; and
      execute the modified HTTP request in accordance with an HTTP method, receive an HTTP response from a distributed application, and output the HTTP response in the web browser.

8. The collaboration server device as set forth in claim 7, wherein the web application is further configured to, when executed by the web browser:
   decompress the HTTP request to decode and extract the HTTP request from the URL associated with the received request; and
   automatically compress content associated with the received modifications and incorporate the compressed content into the URL in order to dynamically update the URL in response to the received modifications.

9. The collaboration server device as set forth in claim 7, wherein the web application is further configured to, when executed by the web browser:
   analyze the received HTTP response to identify a format of one or more portions of the HTTP response; and
   output the one or more portions of the HTTP response in the web browser according to the identified format.

10. The collaboration server device as set forth in claim 9, wherein the identified format comprises a tabular format or a time series format.

11. The collaboration server device as set forth in claim 7, wherein the web application is further configured to, when executed by the web browser:
   parse one or more of the output decoded HTTP request or HTTP response based on one or more received query parameters to generate a query result; and
   output the query result in the web browser.

12. The collaboration server device as set forth in claim 7, wherein the decoded HTTP request and the HTTP response are output in respective panels of a same web page rendered by the web browser and the URL is dynamically updated in an address bar of the web browser.

13. A non-transitory machine readable medium having stored thereon instructions for facilitating improved distributed application development comprising executable code which when executed by one or more processors, causes the one or more processors to:
   provide a web application to a developer device in response to a received request for the web application, wherein the web application is configured to, when executed by a web browser of the developer device:
      determine whether a hypertext transfer protocol (HTTP) request is encoded in a uniform resource locator (URL) associated with the received request for the web application;
      decode the HTTP request and output the decoded HTTP request in the web browser;
      dynamically update the URL in response to one or more received modifications to the decoded HTTP request, the URL identifying the web application; and
      execute the modified HTTP request in accordance with an HTTP method, receive an HTTP response from a distributed application, and output the HTTP response in the web browser.

14. The non-transitory machine readable medium as set forth in claim 13, wherein the web application is further configured to, when executed by the web browser:
   decompress the HTTP request to decode and extract the HTTP request from the URL associated with the received request; and
   automatically compress content associated with the received modifications and incorporate the compressed content into the URL in order to dynamically update the URL in response to the received modifications.

15. The non-transitory machine readable medium as set forth in claim 13, wherein the web application is further configured to, when executed by the web browser:
   analyze the received HTTP response to identify a format of one or more portions of the HTTP response; and
   output the one or more portions of the HTTP response in the web browser according to the identified format.

16. The non-transitory machine readable medium as set forth in claim 15, wherein the identified format comprises a tabular format or a time series format.

17. The non-transitory machine readable medium as set forth in claim 13, wherein the web application is further configured to, when executed by the web browser:
   parse one or more of the output decoded HTTP request or HTTP response based on one or more received query parameters to generate a query result; and
   output the query result in the web browser.

18. The non-transitory machine readable medium as set forth in claim 13, wherein the decoded HTTP request and the HTTP response are output in respective panels of a same web page rendered by the web browser and the URL is dynamically updated in an address bar of the web browser.

* * * * *